(12) United States Patent
Kim et al.

(10) Patent No.: US 6,519,140 B1
(45) Date of Patent: Feb. 11, 2003

(54) HINGED BEZEL FOR A COMPUTER SYSTEM

(75) Inventors: David J. Kim, San Jose, CA (US); William W. Ruckman, San Jose, CA (US); Milton C. Lee, Mountain View, CA (US); Dimitry Struve, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/951,992

(22) Filed: Sep. 13, 2001

(51) Int. Cl.[7] .................................................. G06F 1/16
(52) U.S. Cl. ................. 361/683; 248/202.1; 248/205.1; D14/113; 362/812; 220/4.02
(58) Field of Search .................... 361/683, 679, 361/681, 682; 248/202, 202.1, 205.1; D14/106, 113, 115; 312/7.2; 220/4.02; 362/812, 375, 154, 255

(56) References Cited

U.S. PATENT DOCUMENTS 5,896,273 A * 4/1999 Varghese et al. ............ 361/724
6,018,456 A * 1/2000 Young et al. ................ 361/684
6,130,822 A * 10/2000 Della Fiora et al. ........ 361/724
6,158,867 A * 12/2000 Parker et al. ................. 362/29
6,297,948 B1 * 10/2001 Buican et al. ............... 361/683
6,397,950 B1 * 10/2001 Erwin ......................... 361/685

* cited by examiner

Primary Examiner—Darren Schuberg
Assistant Examiner—Lisa Lea-Edmonds
(74) Attorney, Agent, or Firm—Meyertons Hood Kivlin Kowert & Goetzel, P.C.; B. Noël Kivlin

(57) ABSTRACT

A bezel assembly for a computer enclosure includes a bezel and a hinge capable of hingedly joining the bezel to the computer enclosure. A computer system includes an enclosure, a bezel, and a hinge capable of hingedly joining the bezel to the enclosure. A method of replacing a first component with a second component in a computer system enclosure having a hinged bezel includes pivoting the hinged bezel away from the computer system enclosure and removing the first component from the computer system enclosure. The method further includes inserting the second component into the computer system enclosure and pivoting the hinged bezel toward the computer system such that the hinged bezel is adjacent the computer system enclosure.

22 Claims, 4 Drawing Sheets

HINGED BEZEL FOR A COMPUTER SYSTEM

BACKGROUND OF THE INVENTION

1. Field of the Inventions

This invention relates to a hinged bezel for a computer system. In one aspect, the invention relates to a hinged bezel for a computer system having a glowing logo therein.

2. Description of the Related Art

Computer systems are general-purpose devices that may be modified to perform particular tasks or functions. Generally, computer systems include a motherboard, a power source, and other components mounted within an enclosure. Such components may include hard disk drives, CD-ROM drives, and the like that, from time to time, are removed from the computer system. In conventional computer systems, an enclosure cover may have to be removed to access components mounted within the enclosure. If the computer system is mounted in a rack, the computer system typically is removed from the rack before the enclosure cover can be removed, often resulting in increased servicing time and difficulty.

As computer systems have become more powerful, user interfaces to these systems have become more sophisticated. One example of this higher level of sophistication is the addition of more and more indicator lights corresponding to various functions performed by the computer system. For example, it is common for a computer system to have indicator lights to indicate a power-on condition, hard disk access, CD-ROM access, and the like. These indicator lights are typically small and difficult to distinguish from one another. For example, each indicator light may have an adjacent icon corresponding to the function being indicated by the indicator light. These icons are often merely small markings that are part of the molded case, panel, bezel, or enclosure and are difficult to see.

It is also useful in the effective marketing and branding of computer systems for the producer's logo to be easily noticed and recognized by the buying public. Computer system producers have used various coloring schemes to set their logos apart from background enclosures, panels, bezels, and molded cases. For example, a front bezel of a computer system may be a beige color, while the producer's logo is bright blue in color. As this way of distinguishing brands is common, consumers may not notice one particular logo over another.

SUMMARY OF THE INVENTION

In one aspect of the present invention, a bezel assembly for a computer enclosure is provided. The bezel assembly includes a bezel and a hinge capable of hingedly joining the bezel to the computer enclosure.

In another aspect of the present invention, a computer system is provided. The computer system includes an enclosure, a bezel, and a hinge capable of hingedly joining the bezel to the enclosure.

In yet another aspect of the present invention, a method of replacing a first component with a second component in a computer system enclosure having a hinged bezel is provided. The method includes pivoting the hinged bezel away from the computer system enclosure and removing the first component from the computer system enclosure. In one embodiment, the method further includes inserting the second component into the computer system enclosure and pivoting the hinged bezel toward the computer system such that the hinged bezel is adjacent the computer system enclosure.

In a further aspect of the present invention, a method of displaying a glowing logo in a computer system having a hinged bezel is provided. The method includes applying electrical power a light source of the computer system to emit a light and propagating the light through a logo portion in the hinged bezel. In one embodiment, the method further includes changing a color of the light according to a state of the computer system.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
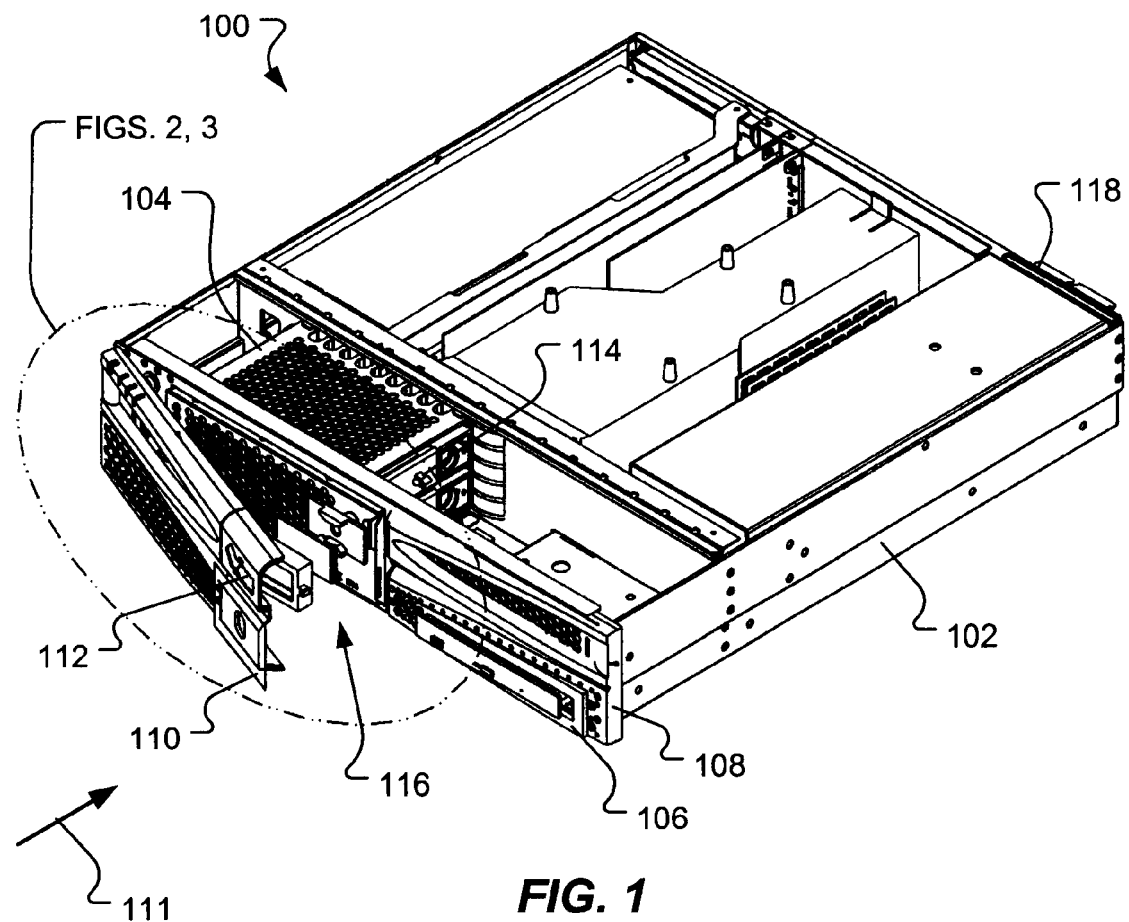
FIG. 1 is a partially-exploded front perspective view of a computer system according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

FIG. 1 illustrates a computer system 100 according to the present invention including an enclosure 102 that houses one or more components. The components may include one or more hard disk drives 104 (only one indicated) and a CD-ROM drive 106, for example. These components may be hot pluggable, i.e., they can be connected or disconnected at any time, even with the power on. The components may be installed or removed through openings (not shown) in a fixed bezel 108. The computer system 100 further includes a bezel 110 that is hingedly joined to the fixed bezel 108. Thus, when the hinged bezel 110 is in an opened position, the hard diskdrive 104 can be removed from the enclosure 102 through the fixed bezel 108 without removing or extending the computer system 100 from a rack (not shown). With the hinged bezel 110 in a closed position, the hard disk drive 104 is not visible as viewed from the front of the computer system 100 (as illustrated by an arrow 111), thus providing an attractive ornamental appearance of the computer system 100.

The computer system 100 illustrated in FIG. 1 also includes a logo 112 in the hinged bezel 110 that is capable of allowing light to propagate therethrough. The logo 112 can be any term or symbol (e.g., a mark, a label, a brand, a name, a logotype, a trademark, an emblem, an icon, a device, or the like). The logo 112 may be an opening through the hinged bezel 110 or may be an optically translucent portion. A light source 114 (e.g., a light-emitting diode, a lamp, an incandescent lamp, a neon lamp, a fluorescent, lamp, a halogen lamp, a metal-halide lamp, or the like) may be disposed within the enclosure 102 such that light emitted from the light source 114 is propagated through the logo 112.

In the illustrated embodiment, a fiber optic assembly 116 is disposed between the light source 114 and the logo 112 such that light emitted from the light source 114 is propagated through the fiber optic assembly 116 and is propagated through the logo 112. Thus, by observing the front of computer system 100 (as illustrated by the arrow 111 ) while light is being emitted from the light source 114 and the hinged bezel 110 is in the closed position, the logo 112 appears to the human eye to glow. Accordingly, by propagating light emitted from the light source 114 through the logo 112, an indication can be seen by the human eye that the computer system 100 is in a power-on state.

In one embodiment, the light source 114 is capable of emitting light of at least one color. Thus, in an embodiment wherein the light source 114 is capable of emitting light of more than one color, the light source 114 may be used to indicate a status of the computer system 100, e.g., computer system health, an operation of the computer system, or the like. For example, causing the light source 114 to emit light of a particular color may be used to indicate that the computer system 100 is operating properly, while causing the light source 114 to emit a light of another color may be used to indicate that a fault exists in the computer system 100.

Similarly, information regarding operation of the computer system 100 may also be communicated by operation of the light source 114 in an intermittent manner. For example, the light source 114 may be programmed to flash in a variety of preselected patterns to correspondingly indicate a variety of information to a user.

Figure 2:
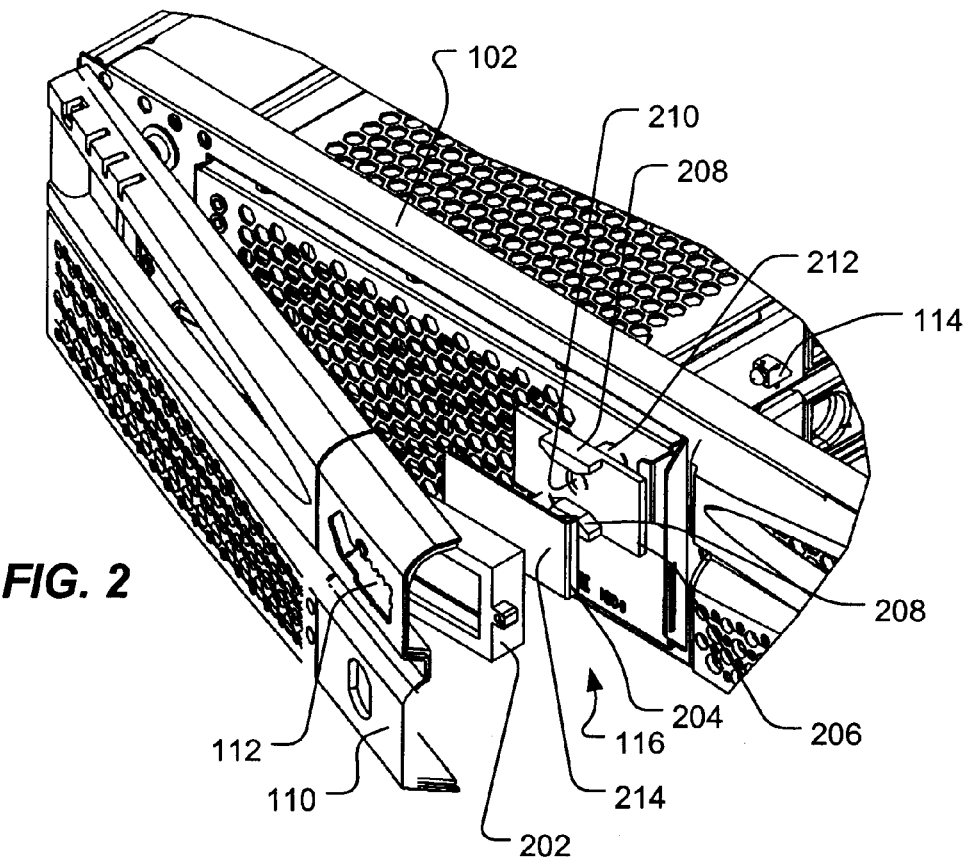
FIG. 2 is a partially-exploded front perspective view of a portion of the computer system illustrated in FIG. 1.
Figure 3:
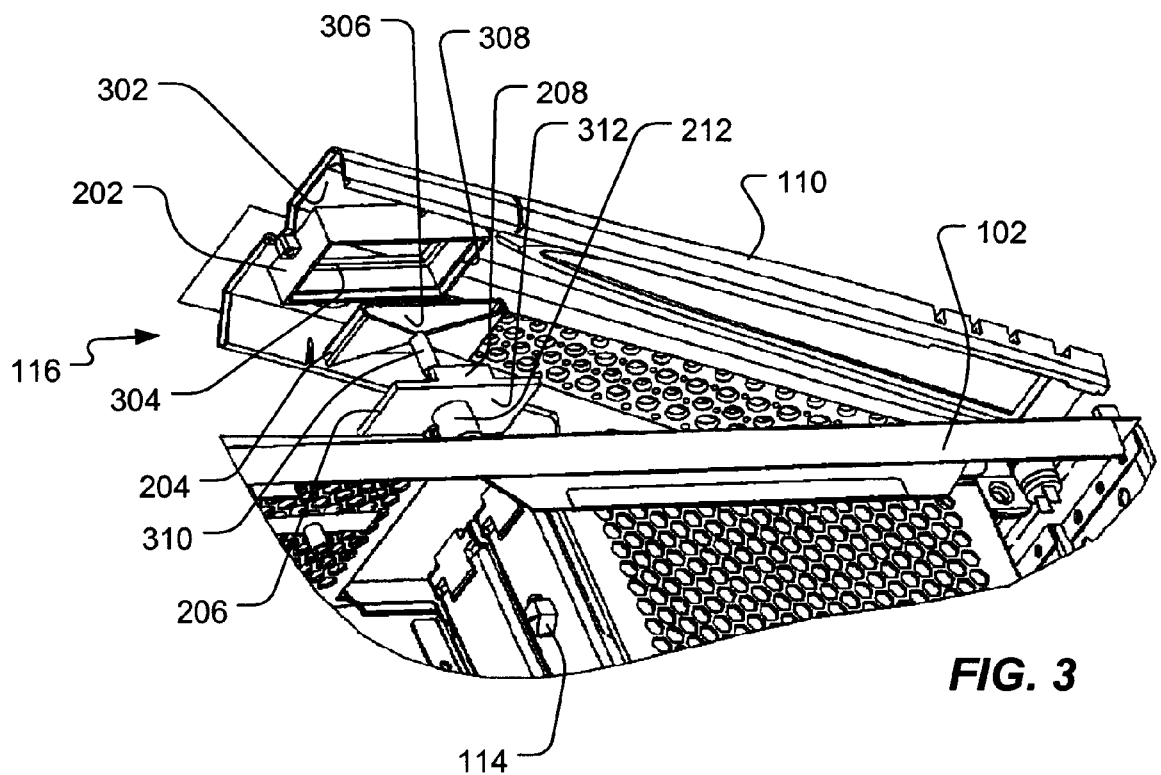
FIGS. 3 is a partially-exploded rear perspective view of the portion of the computer system illustrated in FIG. 2.

Referring now to FIGS. 2 and 3, the fiber optic assembly 116 includes a housing 202 mounted adjacent an inside surface 302 of the hinged bezel 110, A fiber optic device 204 (e.g., a plastic optical fiber backlightihg device, such as a POLYGLO device ftom Poly-Optical Products, Inc. of Irvine, Calif.) is disposcd in the housing 202 adjacent a flange 304 of the housing 202. A lid 206 includes protrasions 208 disposed adjacent a rear portion 306 of the fiber optic device 204 to retain tire fiber optic device 204 within the housing 202. The lid 206 also extends at least partially over a rear opening 308 of the housing 202 and has an opening 210 through which a fiber optic bundle 310 of tile fiber optic device 204 extends. The opening 210 passes through a boss 212 extending from a rear surface 312 of the lid 206 The boss 212 extends through an opening (not shown) in the enclosure 102, and the light source 114 is disposed within the opening 210. Thus, light emitted from the light source 114 propagates thug the opening 210 in the lid 206 and enters (he fiber optic bundle 310 of the fiber optic device 204. The light then propagates through the fiber optic bundle 310 and is emitted from a front surface 214 of the fiber optic device 204. The light then propagates through the logo 112 in the hinged bezel 110.

While the illustrated embodiment includes a fiber optic assembly 116, the present invention encompasses any element or element for guiding light emitted from the light source 114 to the logo 112, e.g., a light-guiding tube, a reflector, or the like. Further, it is within the scope of the present invention for the fiber optic assembly 116 and any element or element for guiding light emitted from the light source 114 to the logo 112 to be omitted, such that light emitted from the light source 114 is propagated directly? through the logo 112.

Figure 4:
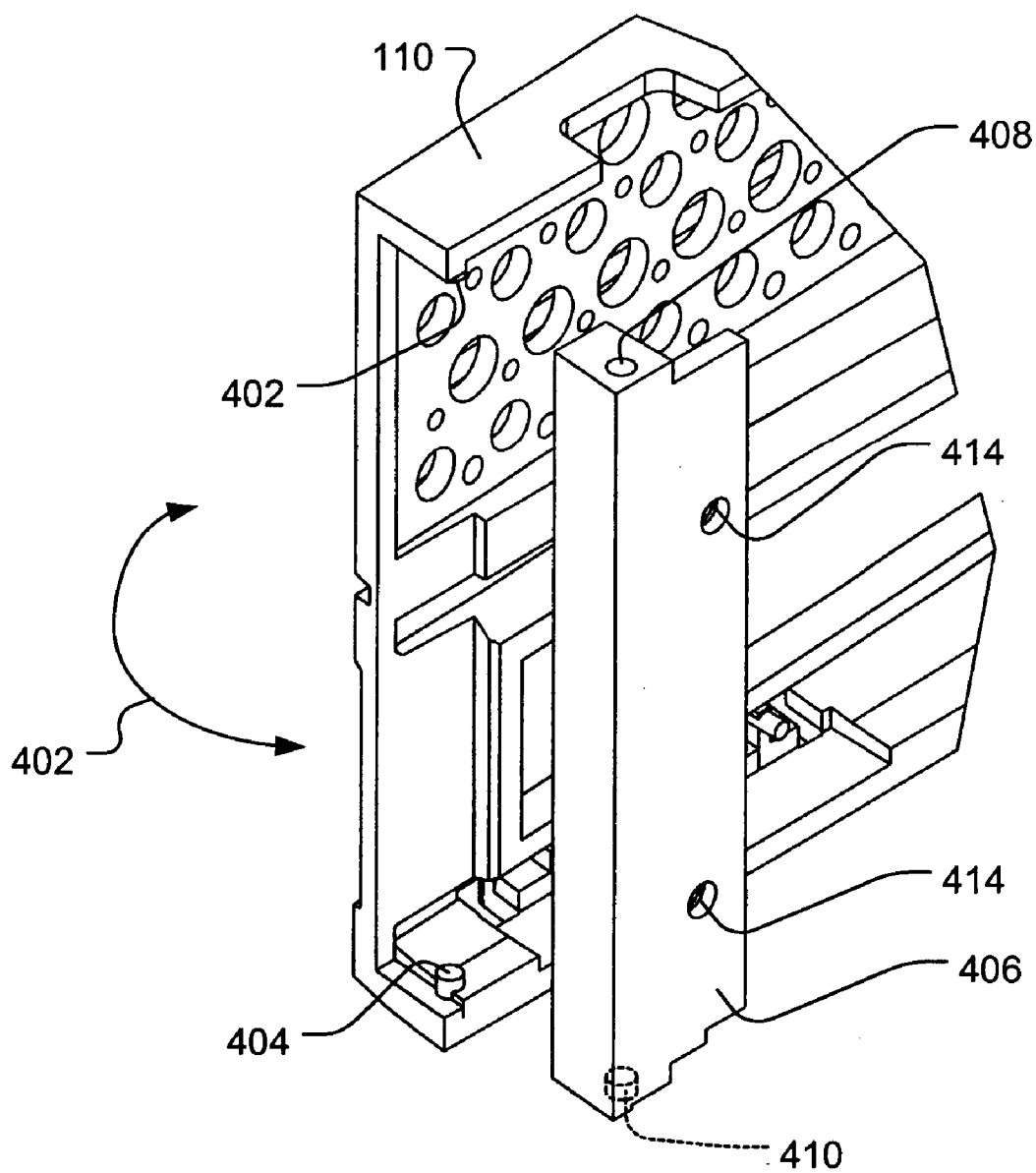
FIG. 4 is an exploded partial perspective view of the hinged bezel illustrated in FIGS. 1–3.

In the embodiment illustrated in FIG. 4, the hinged bezel 110 is joined to the enclosure 102 (not shown in FIG. 4) by an upper hinge pin 402, lower hinge pin 404, and a hinge plate 406. The hinge plate 406 has an upper bore 408 and a lower bore 410 adapted to receive the upper hinge pin 402 and the lower hinge pin 404, respectively. When the upper hinge pin 402 is received in the upper bore 408 and the lower hinge pin 404 is received in the lower bore 410, the hinged bezel 110 is capable of pivoting with respect to the hinge plate 406 as indicated by arrow 412. The hinge plate 406 further includes one or more openings through which a fastener or fasteners (not shown) may be located, so that, when the fastener or fasteners are engaged with the enclosure 102, the hinge plate 406 is held adjacent the enclosure 102.

While the embodiment illustrated in FIG. 4 includes the upper hinge pin 402, the upper bore 408, the lower hinge pin 404, and the lower bore 410 to hingedly join the bezel 110 to the enclosure 102, any structure that hingedly joins the hinged bezel 110 to the enclosure 102 falls within the scope of the present invention. Such structures may include a pair of half hinges that mate and are held together by a hinge pin, a formed polymeric hinge having a reduced-thickness portion to allow hinging, or the like.

Figure 5:
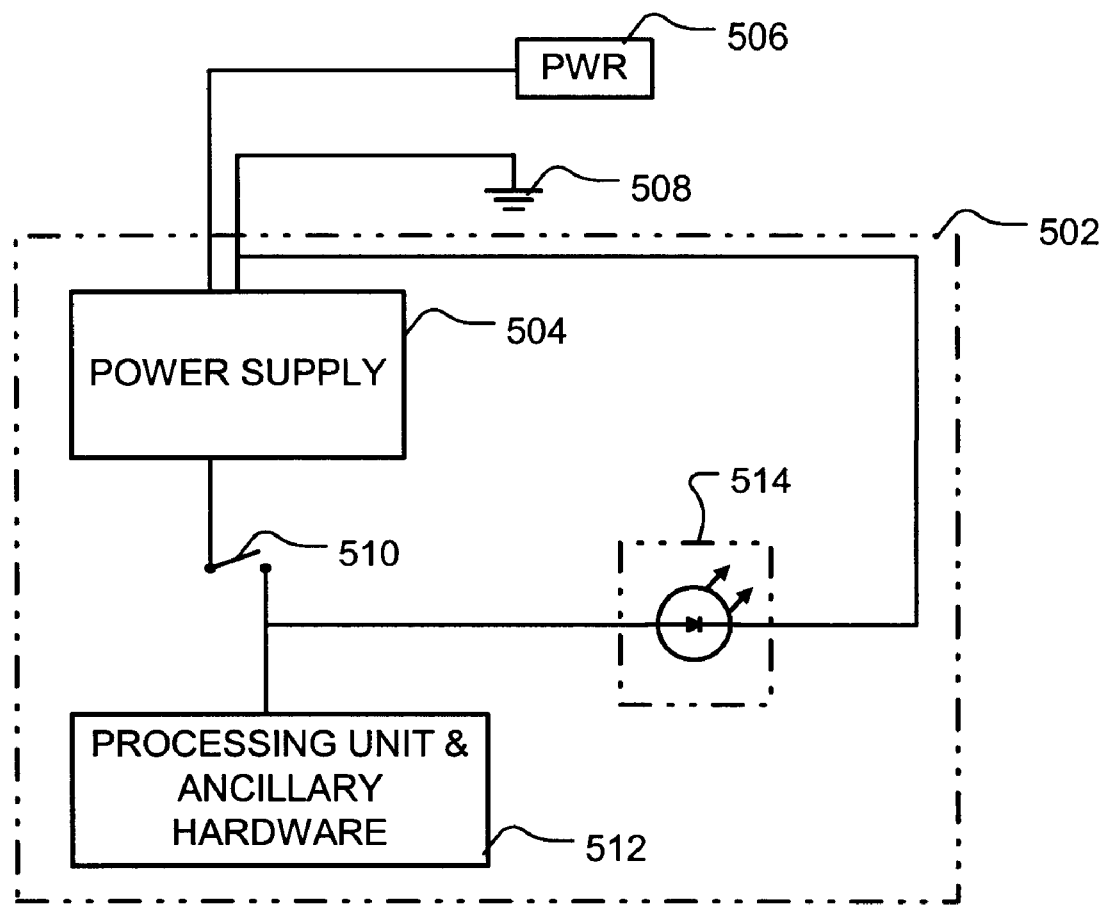
FIG. 5 is a schematic diagram of a computer system according to the present invention.

In the embodiment illustrated in FIG. 5, a computer system 502 includes a power supply 504 electrically connected to a power source 506 and to a ground 508. The computer system 502 further includes a switching device 510, a processing unit and other ancillary hardware 512 and a light source 514. The power supply 504 is electrically connected to the processing unit and other ancillary hardware 512 and the light source 514 when the switching device 510 is in a closed position. Thus, the light source 514 provides an indication when power is supplied to the processing unit and ancillary hardware 512.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A bezel assembly for a computer enclosure, comprising:
   a bezel;
   a hinge capable of hingedly joining the bezel to the computer enclosure; and
   a light source capable of emitting light, wherein the bezel further comprises a logo portion capable of receiving the light from the light source and capable of allowing the light to propagate therethrough.

2. A bezel assembly, according to claim 1, wherein the light source is capable of emitting light of at least one color.

3. A bezel assembly, according to claim 1, wherein the light source is disposed behind the logo portion.

4. A bezel assembly, according to claim 1, wherein the logo portion comprises a translucent material.

5. A bezel assembly, according to claim 1, wherein the light source comprises at least one light-emitting diode.

6. A bezel assembly, according to claim 1, wherein the light source is a lamp selected from the group consisting of an incandescent lamp, a neon lamp, and a fluorescent lamp, a halogen lamp, and a metal-halide lamp.

7. A bezel assembly, according to claim 1, further comprising a light propagating device, disposed between the light source and the logo portion, capable of receiving the light from the light source and propagating the light toward the logo portion.

8. A bezel assembly, according to claim 1, further comprising a fiber optic assembly, disposed between the light source and the logo portion, capable of receiving the light from the light source and propagating the light toward the logo portion.

9. A bezel assembly, according to claim 8, wherein the fiber optic assembly further comprises:
   a housing, adjacent an inside surface of the bezel, having a rear opening;
   a fiber optic device, disposed within the housing, having a fiber optic bundle extending therefrom; and
   a lid covering the rear opening of the housing and defining an opening therethough,
   wherein the fiber optic bundle extends through the opening in the lid toward the light source.

10. A computer system, comprising:
    an enclosure;
    a bezel; and
    a hinge capable of hingedly joining the bezel to the enclosure, the hinge comprising an upper hinge pin joined to the bezel, a lower hinge pin joined to the bezel and a hinge plate, capable of being joined to the computer enclosure, having an upper bore adapted to receive the upper hinge pin and a lower bore adapted to receive the lower hinge pin.

11. A computer system, comprising:
    an enclosure;
    a bezel;
    a hinge capable of hingedly joining the bezel to the enclosure; and
    a light source capable of emitting light, wherein the bezel further comprises a portion capable of receiving the light from the light source and capable of allowing the light to propagate therethrough.

12. A computer system, according to claim 11, wherein the light source is capable of emitting light of at least one color.

13. A computer system, according to claim 11, wherein the light source is disposed behind the logo portion.

14. A computer system, according to claim 11, wherein the logo portion comprises a translucent material.

15. A computer system, according to claim 11, wherein the light source comprises at least one light-emitting diode.

16. A computer system, according to claim 11, wherein the light source is a lamp selected from the group consisting of an incandescent lamp, a neon lamp, and a fluorescent lamp, a halogen lamp, and a metal-halide lamp.

17. A computer system, according to claim 11, further comprising a light propagating device, disposed between the light source and the logo portion, capable of receiving the light from the light source and propagating the light toward the logo portion.

18. A computer system, according to claim 11, further comprising a fiber optic assembly, disposed between the light source and the logo portion, capable of receiving the light from the light source and propagating the light toward the logo portion.

19. A computer system, according to claim 18, wherein the fiber optic assembly further comprises:
    a housing, adjacent an inside surface of the bezel, having a rear opening;
    a fiber optic device, disposed within the housing, having a fiber optic bundle extending therefrom; and
    a lid covering the rear opening of the housing and defining an opening therethough,
    wherein the fiber optic bundle extends through the opening in the lid toward the light source.

20. A computer system, according to claim 11, wherein the light source is capable of emitting light of at least one color corresponding to a status of the computer system.

21. A computer system, according to claim 11, further comprising:
    a processing unit;
    a power source; and
    a switch electrically interconnected with the light source and the processing unit,
    wherein power from the power source is supplied to the processing unit and the light source when the switch is in a closed position.

22. An apparatus for displaying a glowing logo in a computer system having a hinged bezel, comprising:
    means for applying electrical power to a light source of the computer system to emit a light;
    means for propagating the light through a logo portion in the hinged bezel; and
    means for changing a color of the light according to a state of the computer system.

* * * * *